United States Patent [19]

Youngkrantz

[11] Patent Number: 5,133,414
[45] Date of Patent: Jul. 28, 1992

[54] ROW CROP CULTIVATOR

[76] Inventor: Earl A. Youngkrantz, 7505 225th SE., Lake Lillian, Minn. 56253

[21] Appl. No.: 591,393

[22] Filed: Sep. 28, 1990

[51] Int. Cl.$^5$ .............................................. A01B 17/00
[52] U.S. Cl. ..................................... 172/510; 172/508
[58] Field of Search ............... 172/508, 509, 510, 513, 172/174, 175, 176, 155, 181, 708, 694, 182, 142

[56] References Cited

U.S. PATENT DOCUMENTS

| | | | |
|---|---|---|---|
| 3,429,379 | 2/1969 | Tebben | 172/510 |
| 3,501,902 | 3/1970 | Dahl et al. | 172/510 |
| 3,526,281 | 9/1970 | Meaden et al. | 172/510 |
| 3,804,179 | 4/1974 | Johnson | 172/510 |
| 4,142,589 | 3/1979 | Schlogenhauf | 172/510 |
| 4,213,505 | 7/1980 | Jolley | 172/510 |
| 4,485,878 | 12/1984 | Uken | 172/510 |
| 4,591,002 | 5/1986 | Meinert | 172/510 |

OTHER PUBLICATIONS

The Sugarbeet Grower, "Minnesota/Dakota Grower Ideas", p. 22, Mar. 1990.
Koehn Brochure; Vibra Spring Row Crop Cultivator, Allis-Chalmers Brochure; Row Crop Cultivators, 1981.

Primary Examiner—Randolph A. Reese
Assistant Examiner—Spencer Warnick
Attorney, Agent, or Firm—Gregory P. Kaihoi; Edward S. Hotchkiss

[57] ABSTRACT

A row crop cultivator having rolling shields adjacent each of the cultivator shovels to protect the crop from soil thrown by the shovels. The cultivator typically has three or more shovels per furrow, the shovels being spaced laterally and longitudinally from one another. Shields are provided on each side of the centrally located shovels, and, for each off-center shovel, a shield is provided between that shovel and the closest adjacent row of crop. Some of the shields, particularly for the centrally located shovels, may be located closer to the center of the furrow than adjacent shields, allowing close spacing of both shovels and shields to provide the required crop protection. The cultivator allows increased cultivating speed, even for narrow row precision cultivation and even in mellow soils, and also eliminates the clogging problem suffered by conventional tunnel shields in fields having significant trash or crop residue.

6 Claims, 3 Drawing Sheets

ROW CROP CULTIVATOR

FIELD OF THE INVENTION

The invention relates to row crop cultivators used in farming, and particularly to row crop cultivators having shields for protecting the crop from soil being thrown by the cultivator shovels.

BACKGROUND OF THE INVENTION

Row crops are routinely cultivated one or more times during the growing season. As the soil is turned by the cultivator shovels, however, it may damage the crop, particularly if the crop is young and tender. Consequently, shields of various types have been devised to protect the crop from damage by dirt being thrown by cultivator shovels.

One type of shield employed is the rolling or rotating shield. Such shield, typified by U.S. Pat. No. 3,429,379, consists essentially of a disk-shaped member, often concave, carried adjacent the outer-most shovel in a multiple shovel gang (i.e., a gang having multiple shovels in each row). Any dirt being thrown by the adjacent shovel strikes the shield rather than the crop.

For wide row crops and larger size crops, the above rolling shield technique has proven adequate. For precision cultivation of crops in narrower rows (e.g., about 22 inches, as is commonly used for sugar beets and other crops), however, such rolling shields do not provide adequate protection from dirt being thrown from even shovels located in the center of the row. To achieve greater protection for such crops, particularly when they are young and tender, farmers have used tunnel shields. Tunnel shields consist essentially of an inverted trough that extends along a row, covering the crop along the entire length of the cultivator.

Tunnel shields, however, introduce additional problems, in that they easily clog with trash left in the field. To avoid damage to the crop, the tunnels must be manually cleaned whenever they become clogged. This problem has become more acute as farmers seek to farm with increased crop residue in order to reduce soil erosion and conserve water. Moreover, in particularly mellow ground the tunnel shields, being suspended from the cultivator frame, do not always protect the plants from being covered by soil, limiting the speed at which the cultivator may be pulled.

SUMMARY OF THE INVENTION

The invention provides a row crop cultivator capable of adequately protecting crops in diverse soil conditions, including soil having significant amounts of crop residue and particularly mellow ground, even at normal tractor speeds. The invention includes a frame, a plurality of shovels carried by the frame (typically three or more per row spaced laterally and longitudinally from one another), and a plurality of rolling shields also carried by the frame. One rolling shields is located on each side of the centrally located shovel, and an additional shield is located between each off-center shovel and the closest row of crop. With these additional shields, the problem of tunnel blockage is alleviated, and the cultivator may be pulled at normal speeds without fear of covering young seedlings, even in mellow soil. In one application utilizing three shovels and four shields per row, the cultivator of the invention has decreased cultivating time for precision cultivation of sugar beets by 50% compared to tunnel shield cultivating.

BEST MODE FOR CARRYING OUT THE INVENTION

Figure 1:
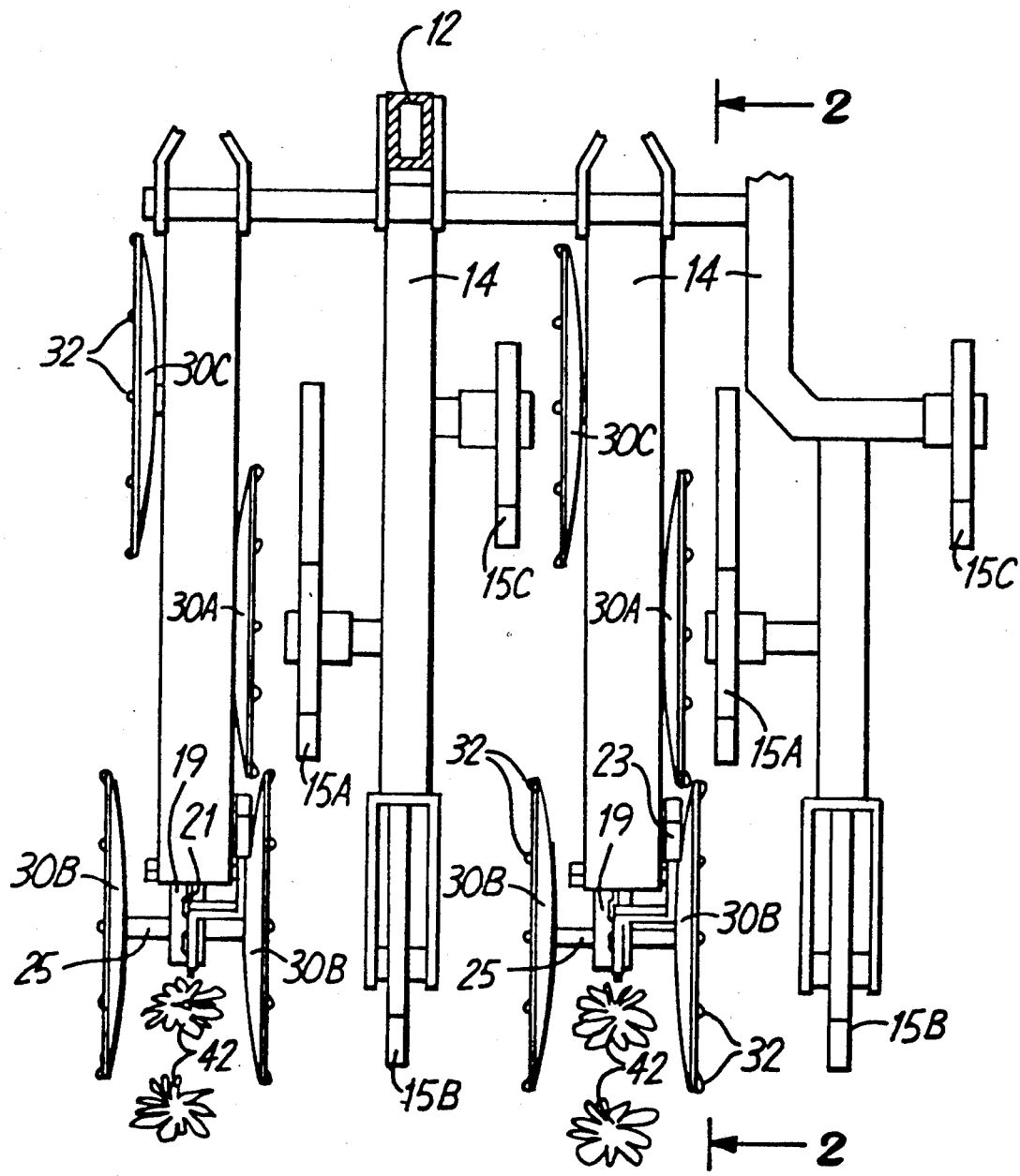
FIG. 1 is a top, partially broken away view of a cultivator of the invention.

FIG. 1 depicts a portion of a multiple row cultivator 10 of the invention. While the invention typically will be used on such multiple row cultivators 10, the number of rows is not particularly critical, as the invention works on but a single row, but is particularly suited for use on multiple gangs of cultivators, such as eight, twelve or even twenty four row cultivators.

The cultivator typically includes a primary frame 12 having a tongue (not shown) attachable to the hitch of a tractor. The primary frame 12 is supported by wheels (not shown) for transport of the cultivator 10. A secondary frame 14, carried by the primary frame 12, is movable between an upper, transport position and a lower, engaged position for cultivating.

The secondary frame 14 carries a gang of shovels 15 for each row. The actual number of shovels depends on the width of the row being cultivated and the size of the shovels. For relatively narrow rows (e.g., about 22 inches), gangs of three shovels 15 are common, one of the shovels 15b being generally centrally located in the furrow, and the other two shovels 15a and 15c, respectively, being located to the left and right sides of the furrow. More shovels can be used, if desired, however.

The rolling shields 30 are also carried by the secondary frame 14 by any suitable framework. In a preferred embodiment, a bar 19 is suspended from the secondary frame 14 by a pair of pivotable support members 17. The bar 19 in turn carries the shields 30, which are attached by suitable axel-bolts 27 and either bushings or bearings 25 (bearings being somewhat preferred). The pivotable nature of the support members 17 allows the bar 19 and shields 30 to move up and down with respect to the secondary frame 14 and the shovels 15, accommodating unevenness in the soil surface. In a multiple row cultivator each set of shields 30 for a given row of plants may be seperately suspended from the secondary frame 14.

Figure 2:
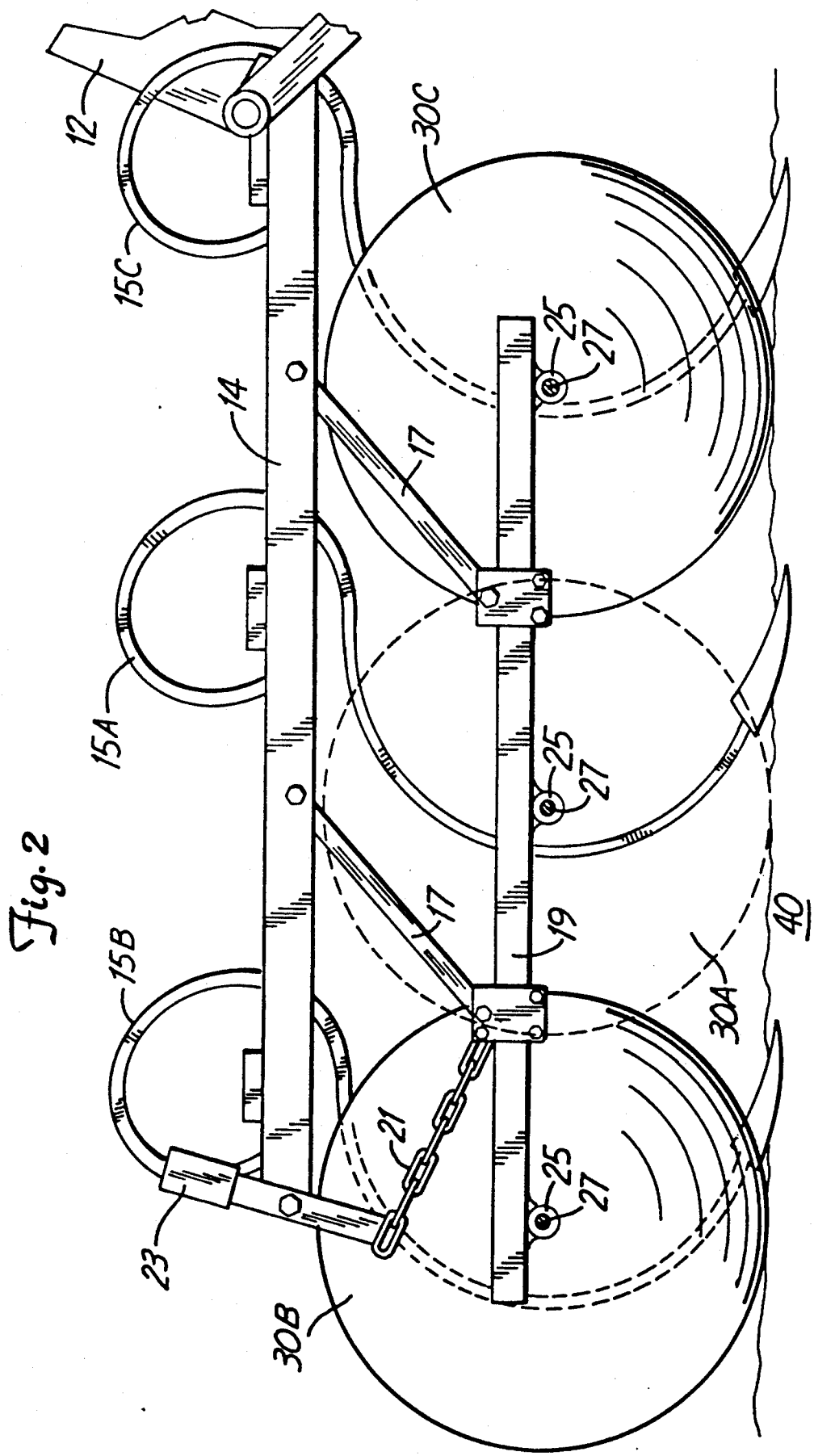
FIG. 2 is a side elevation, partially broken-away, of the cultivator of the invention.

Although the shields 30 normally are allowed to rest on the soil 40 during cultivation, as the crop 42 matures the shields 30 may be suspended slightly above the soil to allow some mounding of dirt against the plants. This is useful, for example, in smothering small weeds growing close to the plants. To so suspend the shields, any suitable mechanical linkage may be used. In one embodiment, as shown in FIG. 2, a chain 21 and rotatable handle 23 is provided to control the distance the shields 30 are suspended below the secondary frame 14—in one position the shields are allowed to contact the soil, and in another position the shields are suspended the desired distance above the soil. The handle/chain structure also serves to limit downward movement of the shields during transport of the cultivator. Other known mechanical linkages may also be used.

The shields 30 desirably are generally concave in shape. This shape assists in deflecting the soil back away from the crop. The shields 30 also preferably include protrusions 32 extending laterally and/or radially from the shield to help keep the shields rolling in the soil, preventing plugging (particularly in fields with heavy residue on the surface of the soil). These protrusions may be welded onto the shield, or, preferably, may be integrally formed with the shield, as by stamping the shields out of suitable steel stock (an example of such a shield is shown in FIG. 4 of U.S. Pat. No. 4,485,878, Uken; preferably such a shield would have more, shorter protrusions than shown in Uken—e.g., about twice as many of a length about half as long as FIG. 4 of Uken).

The shields 30 are positioned to substantially prevent soil from mounding on or damaging the crop. Desirably shields 30b are provided on both sides of the the shovel (or shovels) 15b that is generally centrally located in the furrow. An additional shield 30a is provided to the left of the left-positioned shovel 15a, and another shield 30c to the right of the right positioned shovel 15c. In this manner a shield 30 is positioned between each shovel 15 and the nearest row of crop to prevent damage to the crop.

Figure 3:
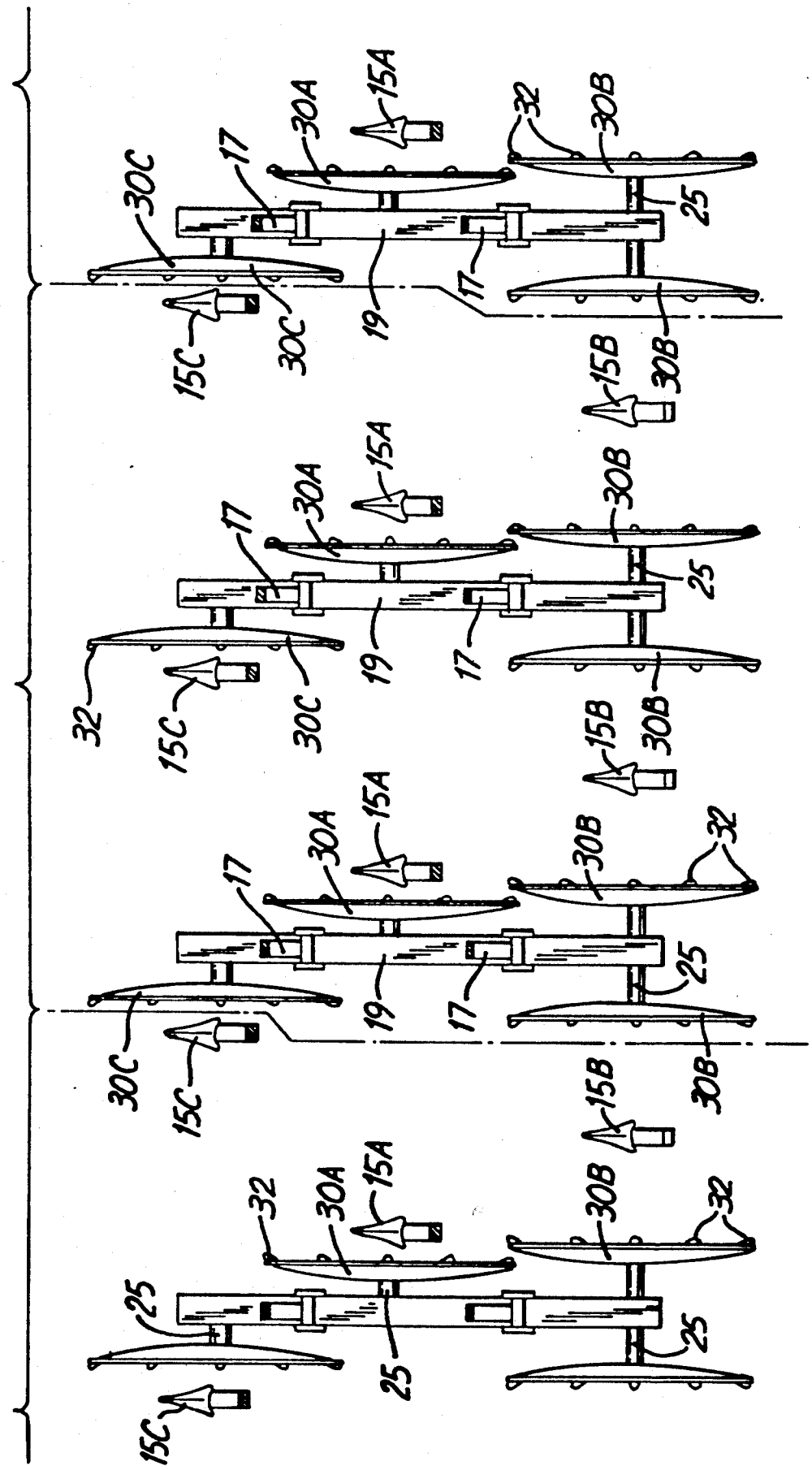
FIG. 3 is a broken-away top plan view of several gangs of the cultivator of the invention.

In the embodiment shown in FIG. 2, the front to-back spacing of the shovels 15 is less than the desired diameter of the shields (which is, e.q., about 15-16 inches). This poses no difficulty for the shields 30b and 30c shown on the right side of the furrow in FIG. 1, but the shields 30a and 30b on the left side of the furrow overlap one another. To allow this overlap, the shield 30b adjacent the central shovel 15b is spaced inwardly toward the center of the furrow (see FIGS. 1 and 3). This location increases the effectiveness of the shield 15b since, within reason, the closer the shield is to the shovel the greater the angle of protection afforded; for this reason the shield on the right side of the central shovel 15b is similarly spaced inwardly toward the center of the furrow.

A cultivator of the invention may be fabricated from any suitable materials. For ease of fabrication and durability, most of the parts are made of steel. A nylon (or similar material) lining in the bushings 25 is desirable to reduce the need for lubrication of the axle-bolt 27; alternately, conventional bearings may be used to assure free rolling motion of the shields. Although the shield configuration of the invention is well suited to original manufacture on cultivators, used cultivators having conventional tunnel shields can also be easily retrofitted with the shields of the invention. Once mounted on the cultivator, the desired shield height is set and routine cultivation may be accomplished. By way of comparison with conventional tunnel shields routinely used in row crop cultivation, which often only permit a speed of 2.5 miles per hour, use of the shield configuration of the invention readily permits a speed of 5 miles per hour, cutting the time needed to cultivate a field by one half.

While a preferred embodiment of the present invention has been described, it should be understood that various changes, adaptations and modifications may be made therein without departing from the spirit of the invention and the scope of the appended claims.

What is claimed is:

1. A cultivator for cultivating one or more furrows between rows of crop in a field, comprising:
    a frame;
    a gang of at least three shovels depending from the frame for cultivating one of the furrows in the field, the shovels being spaced laterally and longitudinally from one another with one or more of such shovels being located generally centrally in the furrow and the others being located toward the left and right sides of the furrow;
    a plurality of rolling shields, two such shields being located respectively adjacent opposite sides of the central one or more shovels, one such shield being located to the left of each leftward located shovel, and one such shield being located to the right of each rightward shovel; and
    a parallel bar linkage suspended from the frame and carrying the rolling shields thereon, the parallel bar linkage being pivotable to permit relative upward and downward parallel movement of the linkage and shields with respect to the frame.

2. The cultivator of claim 1 wherein at least one of the shields is located closer to the center of the furrow than an adjacent shield.

3. The cultivator of claim 1 wherein one of the shields adjacent the centrally located shovel is located closer to the center of the furrow than a shield of an adjacent shovel.

4. The cultivator of claim 1 wherein two adjacent shields are spaced longitudinally from one another so that they partially overlap in protecting an adjacent row of crop from soil dug up by the shovels, one of the shields being located closer to the center of the furrow than the other.

5. The cultivator of claim 1 wherein two of the shovels are spaced longitudinally from one another a distance that is less than the average diameter of their adjacent shields, and one of the shields is located closer to the center of the furrow than the other, the shields being spaced longitudinally from one another so that they partially overlap in protecting an adjacent row of crop from soil dug up by the shovels.

6. A cultivator for cultivating multiple furrows between rows of crop in a field, comprising:
    a frame;
    a plurality of gangs of shovels, each gang including at least three shovels depending from the frame for cultivating one of the furrows in the field, the shovels being spaced laterally and longitudinally from one another with one of the shovels being located generally centrally in the furrow and the other two or more respectively located toward the left and right sides of the furrow; and
    a plurality of rolling shields, two such shields being located respectively adjacent opposite sides of the central shovel, one such shield being located to the left of the left shovel, and one such shield being located to the right of the right shovel;
    two of the shovels being spaced longitudinally from one another a distance that is less than the average diameter of their adjacent shields, and one of those shields being located closer to the center of the furrow than the other, such shields being spaced longitudinally from one another so that they partially overlap in protecting an adjacent row of crop from soil dug up by the shovels; and
    a parallel bar linkage suspended from the frame and carrying the rolling shields thereon, the parallel bar linkage being pivotable to permit relative upward and downward parallel movement of the linkage and shields with respect to the frame.

* * * * *